US012608582B2

(12) United States Patent
Jung et al.

(10) Patent No.: US 12,608,582 B2
(45) Date of Patent: Apr. 21, 2026

(54) SYSTEM AND METHOD FOR GENERATING CONVERSATION BETWEEN ARTIFICIAL INTELLIGENCES

(71) Applicant: ACRYL INC., Seoul (KR)

(72) Inventors: Insik Jung, Seoul (KR); Jisung Park, Seoul (KR); Hyunho Lee, Seoul (KR); Wei Jin Park, Seoul (KR)

(73) Assignee: ACRYL INC., Seoul (KR)

( * ) Notice: Subject to any disclaimer, the term of this patent is extended or adjusted under 35 U.S.C. 154(b) by 1056 days.

(21) Appl. No.: 17/359,015

(22) Filed: Jun. 25, 2021

(65) Prior Publication Data

US 2021/0406638 A1     Dec. 30, 2021

(30) Foreign Application Priority Data

Jun. 25, 2020     (KR) ........................ 10-2020-0077496

(51) Int. Cl.
*G06N 3/006* (2023.01)
*G06F 40/35* (2020.01)
*G06N 20/00* (2019.01)

(52) U.S. Cl.
CPC ............. *G06N 3/006* (2013.01); *G06F 40/35* (2020.01); *G06N 20/00* (2019.01)

(58) Field of Classification Search
CPC ................................. G06N 3/006; G06F 40/35
See application file for complete search history.

(56) References Cited

U.S. PATENT DOCUMENTS 6,219,657 B1 * 4/2001 Hatayama .............. G06N 3/004
706/14
9,672,467 B2 * 6/2017 Gilbert ................... G06N 3/006
(Continued)

OTHER PUBLICATIONS

Li, Yanran, et al. "Hierarchical prediction and adversarial learning for conditional response generation." IEEE Transactions on Knowledge and Data Engineering 34.1 (2020): 314-327. (Year: 2020).*
(Continued)

*Primary Examiner* — Brian L Albertalli
(74) *Attorney, Agent, or Firm* — MARSHALL, GERSTEIN & BORUN LLP

(57) ABSTRACT

A system of generating a conversation between artificial intelligences is proposed. The system includes: first artificial intelligence including a first response generation module configured to generate a response to a start word presented by a user at a beginning of the conversation, the first artificial intelligence configured to evaluate empathy and diversity-emotion weight each for the response generated by a second response generation module of second artificial intelligence and configured to feed back an empathy evaluation score and a diversity-empathy evaluation score; and the second artificial intelligence including a second response generation module configured to generate a response to the conversation generated by the first response generation module of the first artificial intelligence, the second artificial intelligence configured to evaluate the empathy and diversity-emotion weight for the conversation generated by the first response generation module and configured to feed back the empathy evaluation score and the diversity-empathy evaluation score.

10 Claims, 7 Drawing Sheets

(56) References Cited

U.S. PATENT DOCUMENTS

| | | | | |
|---|---|---|---|---|
| 10,970,490 | B2 * | 4/2021 | Kundu | G06F 40/284 |
| 11,012,381 | B2 * | 5/2021 | Chavda | G06N 20/00 |
| 11,295,731 | B1 * | 4/2022 | Wong | H04L 51/02 |
| 12,210,849 | B1 * | 1/2025 | Coursey | G06F 40/58 |
| 2018/0174020 | A1 * | 6/2018 | Wu | G06N 3/044 |
| 2019/0042952 | A1 * | 2/2019 | Jia | G06N 3/045 |
| 2019/0286996 | A1 * | 9/2019 | Tian | G06N 5/02 |
| 2020/0126545 | A1 * | 4/2020 | Kakkar | G06V 10/764 |
| 2020/0234181 | A1 * | 7/2020 | Katz | G06N 20/00 |
| 2022/0245354 | A1 * | 8/2022 | Mackay | G10L 25/63 |

OTHER PUBLICATIONS

Ma, Zhiqiang, et al. "A control unit for emotional conversation generation." IEEE Access 8 (2020): 43168-43176. (Year: 2020).*
Sun, Xiao, et al. "Emotional human machine conversation generation based on SeqGAN." 2018 First Asian Conference on Affective Computing and Intelligent Interaction (ACII Asia). IEEE, 2018. (Year: 2018).*
Zhou, Zhiheng, Man Lan, and Yuanbin Wu. "A neural generation-based conversation model using fine-grained emotion-guide attention." 2018 International Joint Conference on Neural Networks (IJCNN). IEEE, 2018. (Year: 2018).*

* cited by examiner

FIG. 2

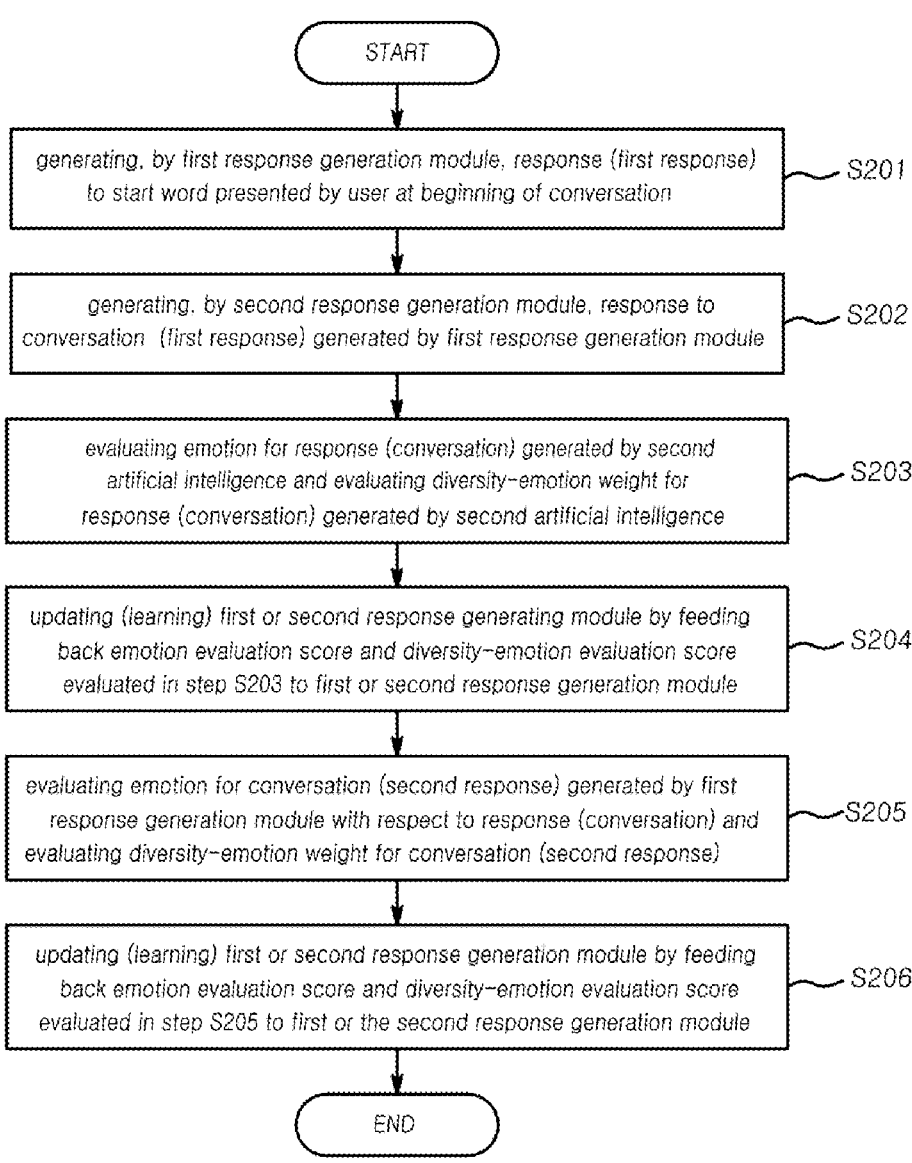

START generating, by first response generation module, response (first response) to start word presented by user at beginning of conversation — S201 generating, by second response generation module, response to conversation (first response) generated by first response generation module — S202 evaluating emotion for response (conversation) generated by second artificial intelligence and evaluating diversity-emotion weight for response (conversation) generated by second artificial intelligence — S203 updating (learning) first or second response generating module by feeding back emotion evaluation score and diversity-emotion evaluation score evaluated in step S203 to first or second response generation module — S204 evaluating emotion for conversation (second response) generated by first response generation module with respect to response (conversation) and evaluating diversity-emotion weight for conversation (second response) — S205 updating (learning) first or second response generation module by feeding back emotion evaluation score and diversity-emotion evaluation score evaluated in step S205 to first or the second response generation module — S206

END

SYSTEM AND METHOD FOR GENERATING CONVERSATION BETWEEN ARTIFICIAL INTELLIGENCES

CROSS REFERENCE TO RELATED APPLICATION

The present application claims priority to Korean Patent Application No. 10-2020-0077496, filed Jun. 25, 2020, the entire contents of which is incorporated herein for all purposes by this reference.

BACKGROUND OF THE INVENTION

Field of the Invention

The present invention relates to a system for generating a conversation and, more particularly, to a system and method for generating a conversation between artificial intelligences, wherein as evaluation criteria for appropriate conversation generation in the conversation between artificial intelligences, empathy of a counterpart, diversity of the conversation, and weight of emotion are utilized to generate the conversation.

Description of the Related Art

Nowadays, along with the development of information and communication technologies based on computers and the Internet, artificial intelligence (AI) technology is also developing gradually, and is currently being applied to various fields.

Artificial intelligence is a field of computer engineering and information technology, wherein studies are conducted on how to enable computers to perform tasks such as thinking, learning, and self-development that intelligence of humans is able to perform, and artificial intelligence is a technology that allows the computers to imitate the intelligent behavior of humans.

Recently, machine learning technology for predicting the future by analyzing vast amounts of big data is attracting attention. Machine learning is similar to big data analysis in that the machine learning collects and analyzes data to predict the future, but is different from big data analysis in that computers may collect and learn vast amounts of data by themselves. Machine learning is a field of artificial intelligence, and is attracting attention as a core technology for big data. Deep learning is a field of machine learning based on a multi-layered neural network, and is a technique to build a high-level abstraction model from a large volume of data. Such deep learning includes research to express data in a format by which a computer can process, such as a vector or graph, and construct a model that learns the data. For a specific learning goal such as recognizing a face or expression, deep learning focuses on constructing better representational methods and efficient models for learning.

In general, deep learning models evaluate and score input data and learn the data by feedback. An engine for generating a conversation has been proposed in various forms in the related art, but it is not clearly defined about criteria of an evaluation model for determining whether an appropriate dialogue is generated in a conversation between artificial intelligences.

Meanwhile, Korean Application Publication No. 10-2019-0079253 disclosed "MULTI AGENT STRUCTURE FOR CONVERSATIONAL ARTIFICIAL INTELLIGENCE", and in the multi-agent system for conversational artificial intelligence according to the above disclosure, the multi-agent system is configured to include: a target language analysis agent configured to analyze a target language received from a subject in conversation and generate semantic analysis information and emotion analysis information, each corresponding to the target language; a self-emotion recognition agent configured to model own emotional state of the conversational artificial intelligence in consideration of a conversation flow respect to the target language; a conversation-context recognition agent configured to recognize context of a conversation on the basis of the semantic analysis information, the emotion analysis information, and the own emotional state; a decision-making agent configured to determine whether to maintain or change an initially set goal in consideration of the context of the conversation; and a response generation agent configured to generate a semantic response on the basis of the context of the conversation and the maintained or changed goal.

As described above, in the case of the above document, there is an advantage that it is possible for artificial intelligence to improve ability thereof to determine context of a conversation by analyzing emotion as well as meaning that a subject desires to convey, and as including a self-emotion recognition function and a decision-making function, artificial intelligence may lead the context of the conversation by changing topics of the conversation according to own emotional state and goal thereof. However, likewise, since there is no special reference about criteria of an evaluation model for determining whether an appropriate dialogue is generated in a conversation between artificial intelligences, there is a problem that it is unclear about the criteria of the evaluation model.

SUMMARY OF THE INVENTION

The present invention has been devised in comprehensive consideration of the above matters, and an objective of the present invention is to provide a system and method for generating a conversation between artificial intelligences, wherein as evaluation criteria for appropriate conversation generation in the conversation between artificial intelligences, empathy of a counterpart, diversity of a conversation, and weight of emotion are utilized to generate the conversation, thereby generating an appropriate dialogue in the conversation between artificial intelligences.

In order to achieve the objective, according to the present invention, there is provided a system for generating a conversation between artificial intelligences, the system including: first artificial intelligence comprising a first response generation module configured to generate a response (i.e., first response) to a start word presented by a user at a beginning of the conversation, the first artificial intelligence configured to evaluate empathy and diversity-emotion weight each for the response (i.e., conversation) generated by a second response generation module of second artificial intelligence with respect to the first response (i.e., conversation) and configured to feed back an empathy evaluation score and a diversity-empathy evaluation score each for the response generated by the second response generation module to the first response generation module or the second response generating module so that the first response generation module or the second response generation module is updated (i.e., learned); and the second artificial intelligence comprising the second response generation module configured to generate a response to the conversation (i.e., first response) generated by the first response generation module of the first artificial intelligence, the second artificial intelligence configured to evaluate the empathy and diversity-emotion weight for the conversation (i.e., second response) generated by the first response generation module with respect to the conversation (i.e., response) generated by the second response generation module and configured to feed back an empathy evaluation score and a diversity-empathy evaluation score each for the second response generated to the first response generation module or the second response generation module so that the first response generation module or the second response generation module is updated (i.e., learned), wherein the first artificial intelligence and the second artificial intelligence repeatedly learn the first and second response generation modules respectively through conversations with each other in a same pattern as described above.

Here, the first artificial intelligence may include: the first response generation module configured to generate the response (i.e., first response) to the start word presented by the user at the beginning of the conversation and generate a response (i.e., second response) to the conversation (i.e., response) generated by the second artificial intelligence with respect to the first response (i.e., conversation); a first empathy evaluation module configured to evaluate the empathy for the response generated by the second artificial intelligence with respect to the conversation generated by the first artificial intelligence; and a first conversation diversity-emotion weight evaluation module configured to evaluate the diversity-emotion weight for the response generated by the second artificial intelligence with respect to the conversation generated by the first artificial intelligence.

In addition, the second artificial intelligence may include: the second response generation module configured to generate a response to the conversation (i.e., first response) initially generated by the first response generation module of the first artificial intelligence and generate a response to the conversation (i.e., second response) generated by the first response generation module with respect to the conversation (i.e., response) generated by the second artificial intelligence; a second empathy evaluation module configured to evaluate the empathy for the conversation (i.e., second response) generated by the first response generation module; and a second conversation diversity-emotion weight evaluation module configured to evaluate the diversity-emotion weight for the conversation (i.e., second response) generated by the first response generation module.

Here, in addition, preferably, in learning the first and second response generation modules respectively, the number of conversations may be set before the learning so that a meaningful learning conversation is generated, and when the number of conversations is exceeded, the first and second artificial intelligence may respectively terminate the learning of the first and second response generation modules.

In addition, preferably, the empathy and the diversity-emotion weight each to be learned by the first and second artificial intelligence may be first set before learning the conversation between the first and second artificial intelligence.

In addition, preferably, learning may be first performed respectively on the first and second empathy evaluation modules and the first and second conversation diversity-emotion weight evaluation modules before learning the conversation between the first and second artificial intelligence.

In this case, in the learning of the first and second empathy evaluation modules, the empathy to be learned or empathy not to be learned may be specified so that the learning may be performed to increase the empathy evaluation score when the empathy of the artificial intelligence of a counterpart is included in the empathy to be learned, and the learning may be performed to lower the empathy evaluation score when the empathy is included in the empathy not to be learned.

In this case, in addition, in the learning of the first and second conversation diversity-emotion weight evaluation modules, by setting in advance whether to have an emotional conversation or a diverse conversation, the learning may be performed to increase the diversity-empathy evaluation score when the conversation is generated as the setting, and conversely the learning may be performed to lower the diversity-empathy evaluation score when the conversation is not generated as the setting.

In addition, in order to achieve the objective, according to the present invention, there is provided a method for generating a conversation between artificial intelligences, the method based on a system for generating a conversation between artificial intelligences, the system including: first artificial intelligence provided with a first response generation module, a first empathy evaluation module, and a first conversation diversity-emotion weight evaluation module; and second artificial intelligence provided with a second response generation module, a second empathy evaluation module, and a second conversation diversity-emotion weight evaluation module, the method including: a) generating, by the first response generation module, a response (i.e., first response) to a start word presented by a user at a beginning of the conversation; b) generating, by the second response generation module of the second artificial intelligence, a response to the conversation (i.e., first response) generated by the first response generation module; c) evaluating, by the first empathy evaluation module, empathy for the response (i.e., conversation) generated by the second artificial intelligence and evaluating, by the first conversation diversity-emotion weight evaluation module, diversity-emotion weight for the response (i.e., conversation) generated by the second artificial intelligence; d) updating (i.e., learning) the first response generation module or the second response generation module by feeding back an empathy evaluation score and a diversity-empathy evaluation score each evaluated in step c) to the first response generation module or the second response generation module; e) evaluating, by the second empathy evaluation module, the empathy for the conversation (i.e., second response) generated by the first response generation module with respect to the response (i.e., conversation) generated by the second response generation module and evaluating, by the second conversation diversity-emotion weight evaluation module, diversity-emotion weight for the conversation (i.e., second response) generated by the first response generation module; and f) updating (i.e., learning) the first response generation module or the second response generation module by feeding back the empathy evaluation score and the diversity-empathy evaluation score each evaluated in step e) to the first response generation module or the second response generation module.

Here, preferably, in learning the first or second response generation modules in step (d) or step (f), respectively, the number of conversations may be set before learning so that a meaningful learning conversation is generated, and when that number of conversations is exceeded, the first and second artificial intelligence may respectively terminate the learning of the first and second response generation modules.

In addition, preferably, the empathy and the diversity-emotion weight each to be learned by the first and second artificial intelligence may be first set before learning the conversation between the first and second artificial intelligence.

In addition, preferably, the learning may be first performed respectively for a first and second empathy evaluation modules and a first and second conversation diversity-emotion weight evaluation modules before learning the conversation between the first and second artificial intelligence.

In this case, in learning the first and second empathy evaluation modules, the empathy to be learned or empathy not to be learned may be specified, so that the learning may be performed to increase the evaluation score when the empathy of the artificial intelligence of the counterpart is included in the empathy to be learned, and the learning may be performed to lower the evaluation score when the empathy is included in the empathy not to be learned.

In this case, in addition, in learning the first and second conversation diversity-emotion weight evaluation modules, by setting in advance whether to have an emotional conversation or a diverse conversation, the learning may be performed to increase the evaluation score when the conversation is generated as the setting, and conversely the learning may be performed to lower the evaluation score when the conversation is not generated as the setting.

According to the present invention, as evaluation criteria for appropriate conversation generation in the conversation between artificial intelligences, empathy of the counterpart, diversity of the conversation, and weight of the emotion are utilized to generate the conversation, thereby having an advantage of generating an appropriate dialogue in the conversation between artificial intelligences.

BRIEF DESCRIPTION OF THE DRAWINGS

FIG. 2 is a flowchart showing an execution process of a method for generating a conversation between artificial intelligences according to the present invention.

DETAILED DESCRIPTION OF THE INVENTION

The terms or words used in this description and claims are not to be construed as being limited to their ordinary or dictionary meanings, and should be interpreted as meanings and concepts corresponding to the technical spirit of the present invention based on the principle that inventors may properly define the concept of a term in order to best describe their invention.

Throughout the description of the present invention, when a part is said to "include" or "comprise" a certain component, it means that it may further include or comprise other components, except to exclude other components unless the context clearly indicates otherwise. In addition, the terms "~ part", "~ unit", "module", and the like mean a unit for processing at least one function or operation and may be implemented by a combination of hardware and/or software.

Hereinafter, an exemplary embodiment of the present invention will be described in detail with reference to the accompanying drawings.

Figure 1:
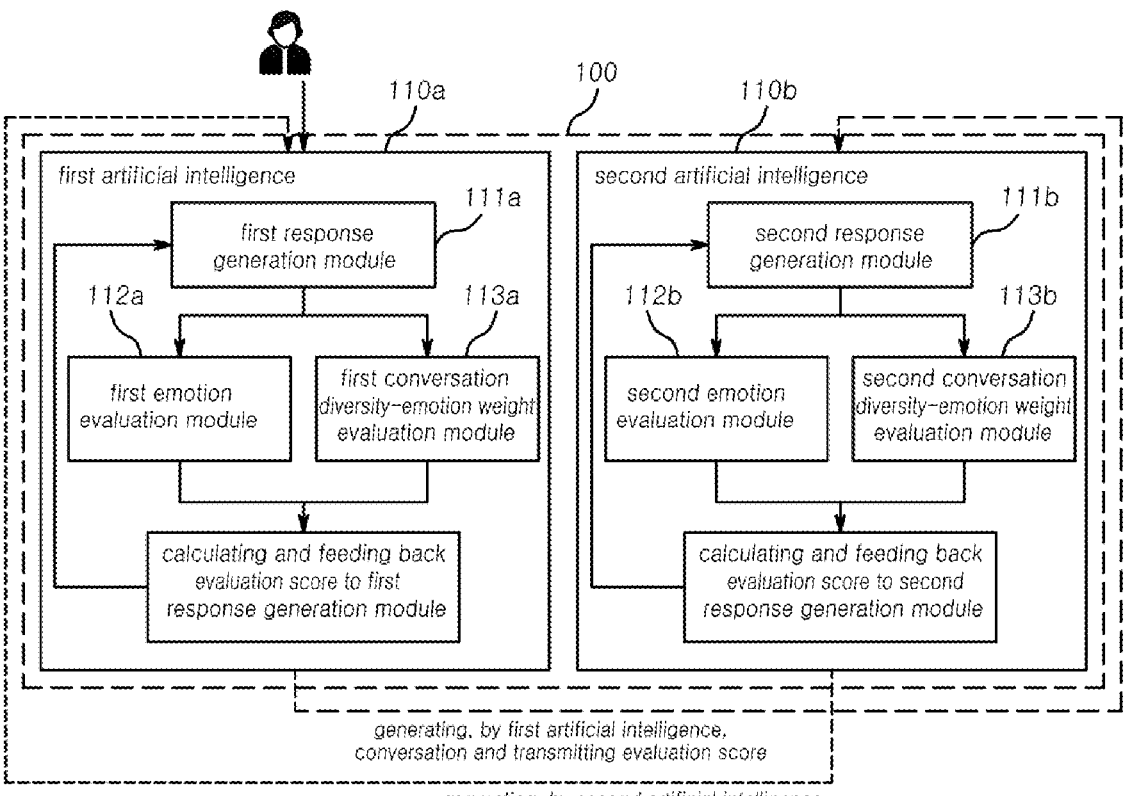
FIG. 1 is a view schematically showing a configuration of a system for generating a conversation between artificial intelligences according to the present invention.

FIG. 1 is a view schematically showing a configuration of a system for generating a conversation between artificial intelligences according to the exemplary embodiment of the present invention.

Referring to FIG. 1, a system 100 for generating a conversation between artificial intelligences according to the present invention is configured to include: first artificial intelligence 110a; and second artificial intelligence 110b.

Figure 5:
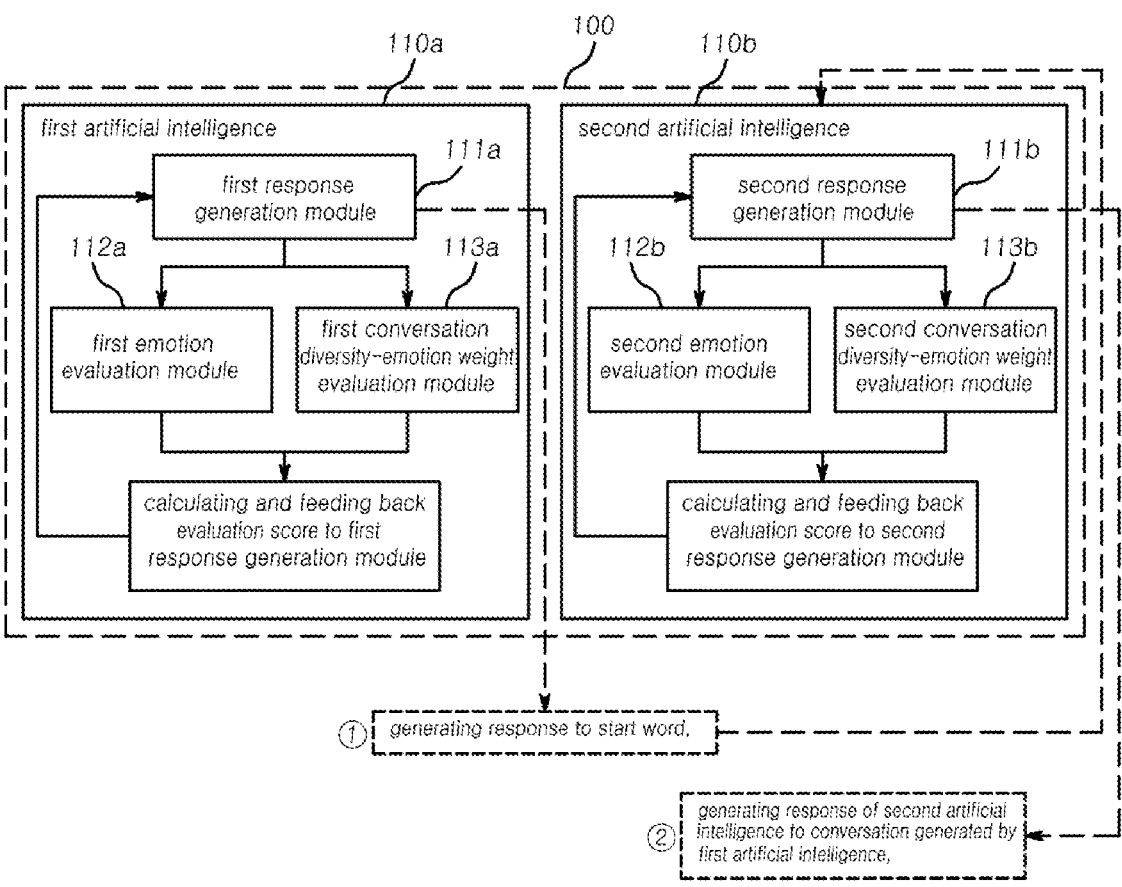
FIG. 5 is a view showing a process in which second artificial intelligence generates a response on the basis of the response (i.e., conversation) generated by the first artificial intelligence.
Figure 6:
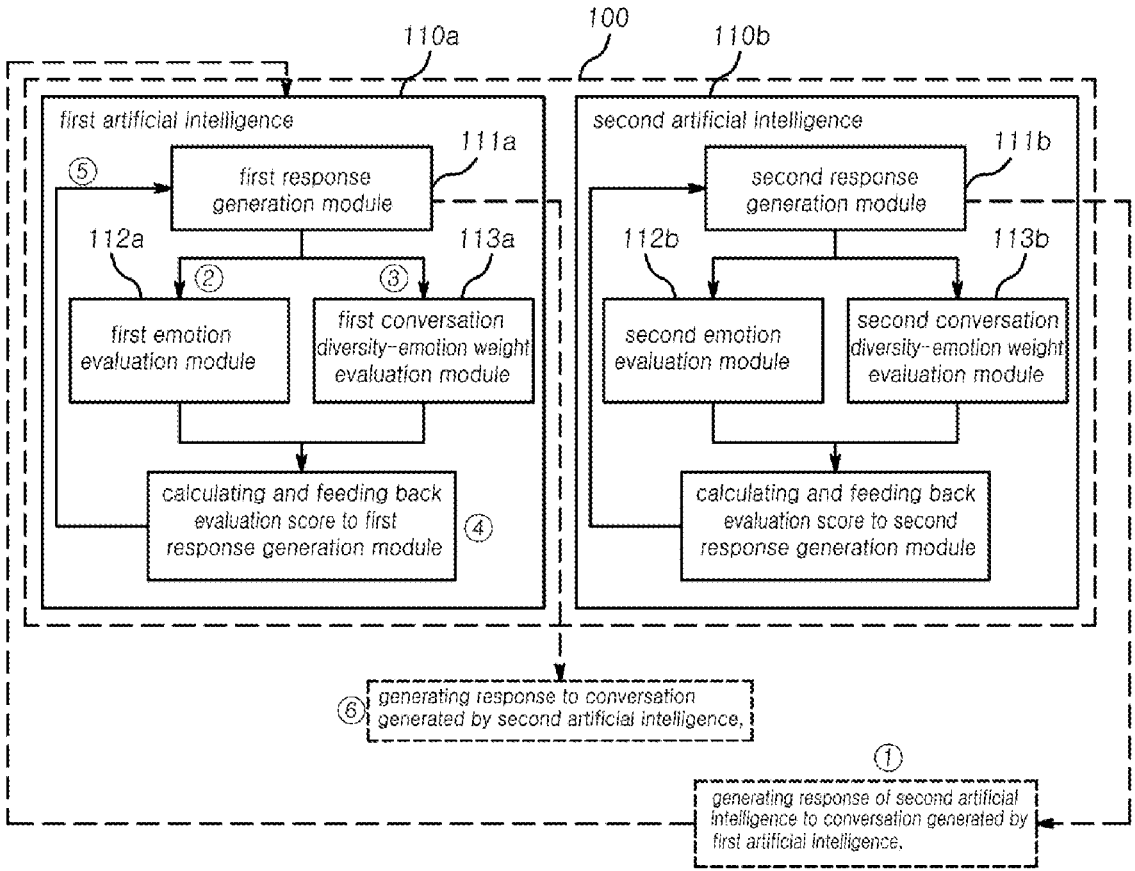
FIG. 6 is a view showing a process of updating the first response generation module of the first artificial intelligence by evaluating the empathy and diversity-emotion weight of the conversation (i.e., response) generated by the second artificial intelligence.

The first artificial intelligence 110a includes a first response generation module 111a configured to generate a response (i.e., first response) to a start word presented by a user at the beginning of a conversation, evaluates empathy and diversity-emotion weight (refer to FIG. 6) each for a response (i.e., conversation) generated by a second response generation module 111b of the second artificial intelligence 110b for the first response (i.e., conversation) (refer to FIG. 5), and feeds back an empathy evaluation score and a diversity-empathy evaluation score for the response generated by the second response generation module 111b to the first response generation module 111a or the second response generation module 111b so that the first response generating module 111a or the second response generation module 111b is updated (i.e., learned) (refer to FIG. 6).

Figure 7:
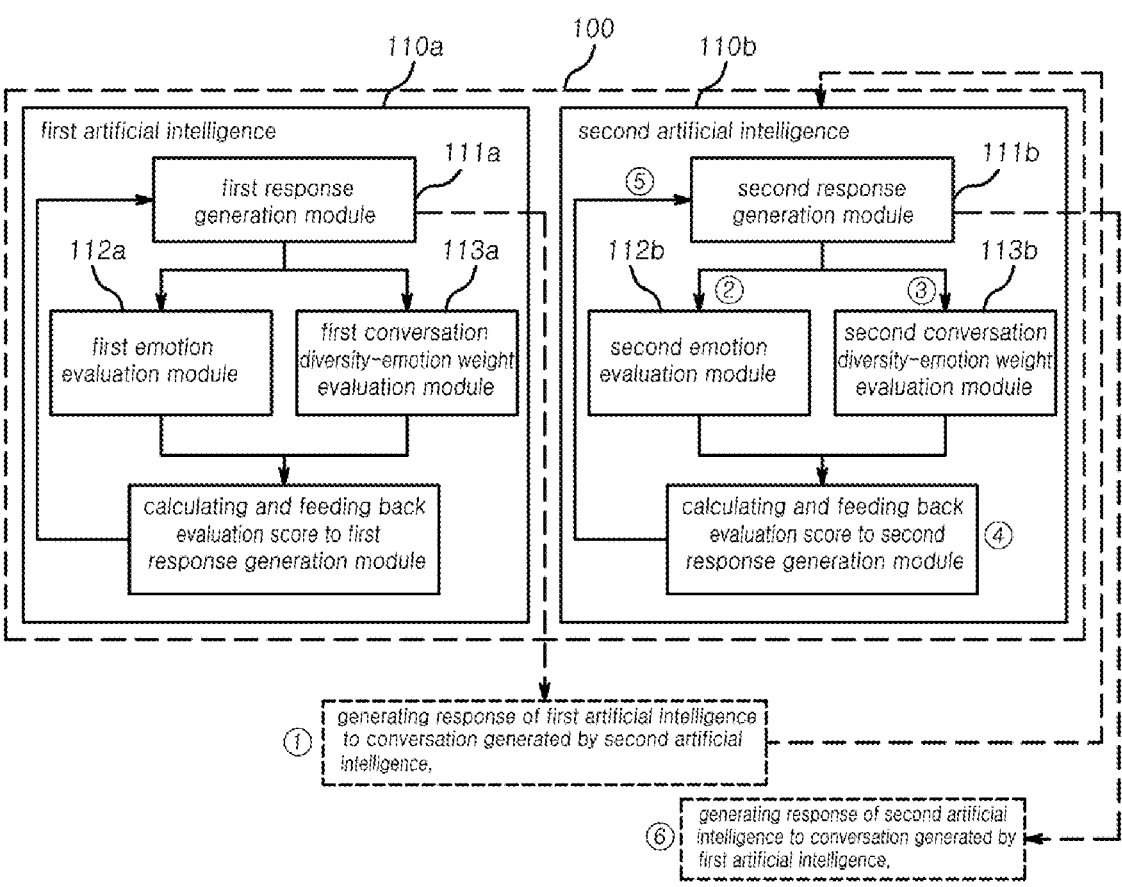
FIG. 7 is a view showing a process of updating the second response generation module of the second artificial intelligence by evaluating the empathy and diversity-emotion weight of the conversation (i.e., second response) generated by the first artificial intelligence.

The second artificial intelligence 110b includes a second response generation module 111b configured to generate a response to a conversation (i.e., first response) generated by the first response generation module 111a of the first artificial intelligence 110a (refer to FIG. 5), evaluates empathy and diversity-emotion weight each for a conversation (i.e., response) generated by the first response generation module 111a for a conversation (i.e., response) generated by the second response generation module 111b (refer to FIG. 7), and feeds back the empathy evaluation score and the diversity-empathy evaluation score for the second response to the first response generation module 111a or the second response generation module 111b so that the first response generation module 111a or the second response generation module 111b is updated (i.e., learned) (refer to FIG. 7).

As described above, the first artificial intelligence 110a and the second artificial intelligence 110b repeatedly learn the first and second response generation modules 111a and 111b, respectively, through conversations with each other in the same pattern as above.

Here, the first artificial intelligence 110a may be configured to include: a first response generation module 111a configured to generate a response (i.e., first response) to a start word presented by a user at the beginning of a conversation (refer to FIG. 4) and generate a response (i.e., second response) (refer to FIG. 6) to the conversation (i.e., response) generated by the second artificial intelligence 110b with respect to the first response (i.e., conversation)

(refer to FIG. 5); a first empathy evaluation module 112*a* configured to evaluate empathy for the response generated by the second artificial intelligence 110*b* with respect to the conversation generated by the first artificial intelligence 110*a* (refer to FIG. 6); and a first conversation diversity-emotion weight evaluation module 113*a* configured to evaluate diversity-emotion weight for the response generated by the second artificial intelligence 110*b* with respect to the conversation generated by the first artificial intelligence 110*a* (refer to FIG. 6).

In addition, the second artificial intelligence 110*b* may be configured to include: a second response generation module 111*b* configured to generate a response to the conversation (i.e., first response) initially generated by the first response generation module 111*a* of the first artificial intelligence 110*a* (refer to FIG. 5) and generate a response to the conversation (i.e., second response) generated by the first response generation module 111*a* with respect to the conversation (i.e., response) generated by the second artificial intelligence 110*b* (refer to FIG. 7); a second empathy evaluation module 112*b* configured to evaluate empathy for the conversation (i.e., second response) generated by the first response generation module 111*a*; and a second diversity-emotion weight module 113*b* configured to evaluate diversity-emotion weight of the conversation (i.e., second response) generated by the first response generation module 111*a*.

Here, the first and second response generation modules 111*a* and 111*b*, the first and second empathy evaluation modules 112*a* and 112*b*, and the first and second conversation diversity-emotion weight evaluation modules 113*a* and 113*b* described above include technical meaning (or concept) of a deep learning model.

Here, additionally, in learning the first and second response generation modules 111*a* and 111*b*, respectively, the present invention may preferably be configured such that the number of conversations is set before learning so that a meaningful learning conversation may be generated, and when that number of conversations is exceeded, the first and second artificial intelligence 110*a* and 110*b* respectively terminate the learning of the first and second response generation modules 111*a* and 111*b*.

In addition, before learning the conversation between the first and second artificial intelligence 110*a* and 110*b*, the empathy and diversity-emotion weight to be learned by the first and second artificial intelligence 110*a* and 110*b* may preferably be set first.

In addition, preferably, before learning the conversation between the first and second artificial intelligence 110*a* and 110*b*, the learning may be first performed respectively on the first and second empathy evaluation modules 112*a* and 112*b* and the first and second conversation diversity-emotion weight evaluation modules 113*a* and 113*b*.

In this case, in learning the first and second empathy evaluation modules 112*a* and 112*b*, the empathy to be learned or empathy not to be learned is specified, so that the learning may be performed to increase the evaluation score when the empathy of the counterpart's artificial intelligence is included in the empathy to be learned, and may be performed to lower the evaluation score when the empathy of the counterpart's artificial intelligence is included in the empathy not to be learned.

In this case, in learning the first and second conversation diversity-emotion weight evaluation modules 113*a* and 113*b*, by setting in advance whether to have an emotional conversation or a diverse conversation, the learning may be performed to increase the evaluation score when a conversation is generated as the setting, and conversely the learning may be performed to lower the evaluation score when the conversation is not generated as the setting.

Then, hereinafter, the method for generating a conversation between artificial intelligences according to the present invention will be described on the basis of the system for generating a conversation between artificial intelligences according to the present invention, the system having the above configuration.

FIG. 2 is a flowchart showing an execution process of the method for generating a conversation between artificial intelligences according to the exemplary embodiment of the present invention.

Figure 4:
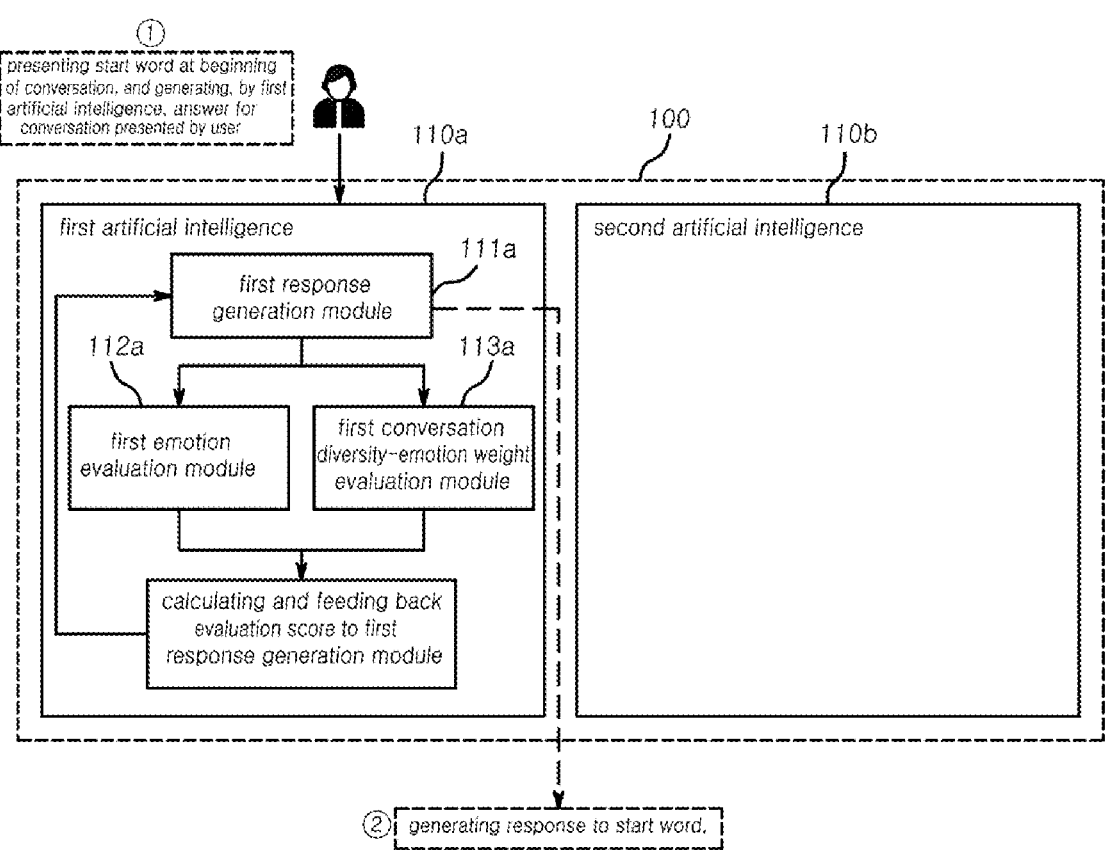
FIG. 4 is a view showing a process in which a user first presents a start word, and first artificial intelligence generates a response (i.e., first response) to the start word through a first response generation module.

Referring to FIG. 2, the method for generating a conversation between artificial intelligences according to the present invention is a conversation generation method based of the system for generating a conversation between artificial intelligences, the system including: first artificial intelligence 110*a* provided with a first response generation module 111*a*, a first empathy evaluation module 112*a*, and a first conversation diversity-emotion weight evaluation module 113*a*; and second artificial intelligence 110*b* provided with a second response generation module 111*b*, a second empathy evaluation module 112*b*, and a second conversation diversity-emotion weight evaluation module 113*b*. First, as shown in FIG. 4, in step S201, for a start word (e.g., "today") presented by a user at the beginning of a conversation, a response (i.e., first response) (e.g., "What time do you leave work today?") is generated by the first response generation module 111*a*.

Then, in step S202, with respect to the conversation (i.e., first response) generated by the first response generation module 111*a* (e.g., "what time do you leave work today?"), a response (e.g., "I may not be able to leave work today.") is generated by the second response generation module 111*b* of the second artificial intelligence 110*b*, as shown in FIG. 5.

Thereafter, in step S203, as shown in FIG. 6, the empathy for the response (i.e., conversation) (i.e., "I don't think I'll be able to go to work today.") generated by the second response generation module 111*b* (i.e., the second response generating module 111*b* of the second artificial intelligence 110*b*) is evaluated by the first emotion evaluation module 112*a* (e.g., emotion evaluation score: 0.8 points), and the diversity-emotion weight of the response (i.e., conversation) (i.e., "I don't think I'll be able to leave work today.") generated by the second artificial intelligence 110*b* is evaluated by the first conversation diversity-emotion weight evaluation module 113*a* (e.g., diversity-emotion weight score: 0.2 points).

After that, in step S204, an empathy evaluation score and diversity-emotion weight evaluation score for the conversations of the counterpart (i.e., second artificial intelligence 110*b*), the scores being respectively evaluated by the first empathy evaluation module 112*a* and the first conversation diversity-emotion weight evaluation module 113*a*, are fed back to the first response generation module 111*a*, so that the first response generation module 111*a* is updated (i.e., learned).

After that, in step S205, as shown in FIG. 7, the empathy for the conversation (i.e., second response) (e.g., "Oh no, take heart") generated by the first response generation module 111*a* with respect to the response (i.e., conversation) generated by the second response generation module 111*b* is evaluated by the second empathy evaluation module 112*b* (e.g., empathy evaluation score: 0.8 points), and the diversity-emotion weight for the conversation (i.e., second response) (e.g., "Geez, cheer up") generated by the first response generation module 111*a* is evaluated by the second conversation diversity-emotion weight evaluation module 113*b* (e.g., diversity-emotion weight score: 0.2 points).

After that, in step S206, the empathy evaluation score and the diversity-emotion weight evaluation score for the conversation of the counterpart (i.e., the first artificial intelligence 110*a*) respectively evaluated by the second empathy evaluation module 112*b* and the second conversation diversity-emotion weight evaluation module 113*b* are fed back to the second response generation module 111*b*, so that the second response generation module 111*b* is updated (i.e., learned).

As described above, through conversations with each other in the same pattern as above, the first artificial intelligence 110*a* and the second artificial intelligence 110*b* repeatedly learn the first and second response generation modules 111*a* and 111*b*, respectively.

In FIGS. 5 to 7, it has been exemplarily described that the empathy evaluation score and diversity-emotion weight evaluation score evaluated by the first empathy evaluation module 112*a* and the first dialogue diversity-emotion weight evaluation module 113*a* are fed back only to the first response generation module 111*a*, and the empathy evaluation score and diversity-emotion weight evaluation score respectively evaluated by the second empathy evaluation module 112*b* and the second conversation diversity-emotion weight evaluation module 113*b* are fed back only to the second response generation module 111*b*. However, the scope of the present invention is not limited thereto, and as indicated by the blue and red dotted lines in FIG. 1, the empathy evaluation score and diversity-emotion weight evaluation score respectively evaluated by the first empathy evaluation module 112*a* and the first conversation diversity-emotion weight evaluation module 113*a* may be fed back only to the second response generation module 111*b* or may be fed back to both of the first response generation module 111*a* and the second response generating module 111*b*. In addition, the empathy evaluation score and the diversity-emotion weight evaluation score respectively evaluated by the first empathy evaluation module 112*b* and the first conversation diversity-emotion weight evaluation module 113*b* may be fed back only to the first response generation module 111*a* or may be fed back to both the first response generation module 111*a* and the second response generating module 111*b*.

Here, preferably, in steps S204 and S206, in learning the first and second response generation modules 111*a* and 111*b*, respectively, the number of conversations (e.g., 10 times or 20 times, etc.) prior to learning is set so that meaningful learning conversations may be generated, and when that number of conversations is exceeded, the first and second artificial intelligence 110*a* and 110*b* may respectively terminate learning of the first and second response generation modules 111*a* and 111*b*.

Figure 3:
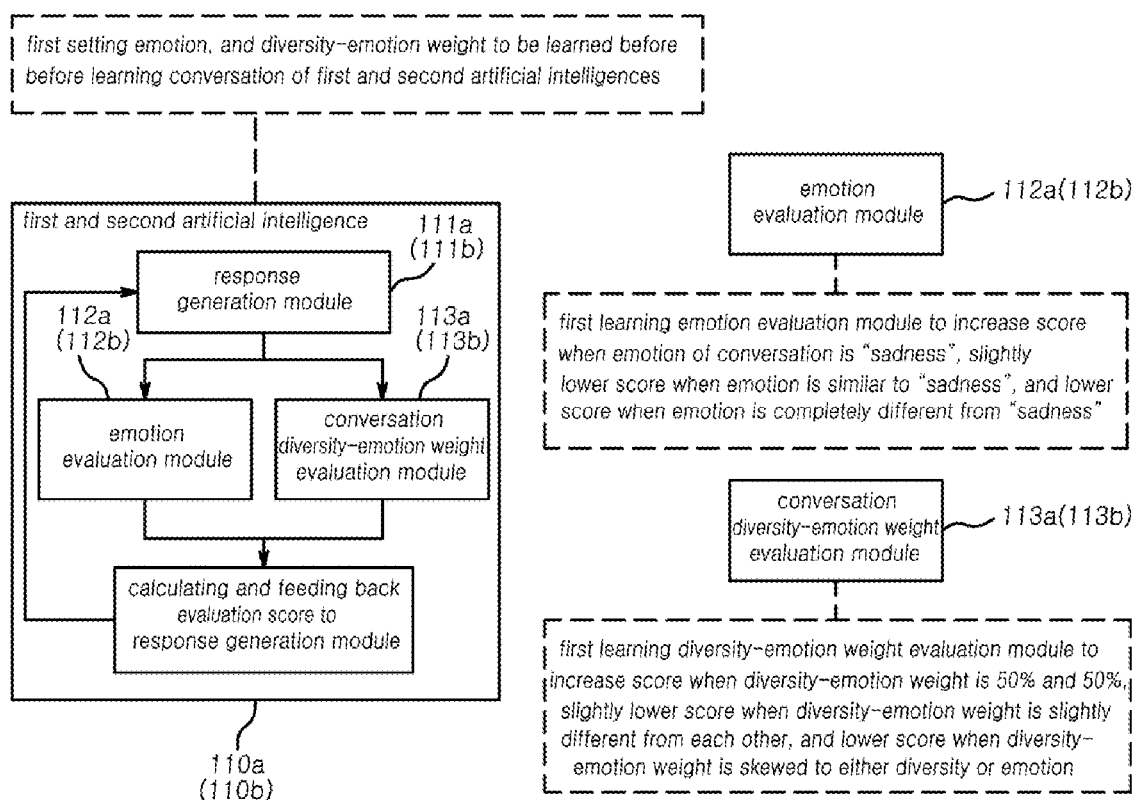
FIG. 3 is a view showing an overview of first setting empathy and diversity-emotion weight each to be learned before conversational learning between artificial intelligences, and first learning an empathy evaluation module and a conversation diversity-emotion weight evaluation module.

In addition, preferably, before learning the conversation between the first and second artificial intelligence 110*a* and 110*b*, as shown in FIG. 3, the empathy and diversity-emotion weight to be learned by the first and second artificial intelligence 110*a* and 110*b* may be first set. For example, the empathy of a counterpart to be learned may be set to "sadness", and the conversation diversity-emotion weight of the counterpart to be learned may be set to diversity: 50%, and emotion: 50%.

In addition, before learning the conversation between the first and second artificial intelligence 110*a* and 110*b*, the first and second empathy evaluation modules 112*a* and 112*b* and the first and second conversation diversity-emotion weight evaluation modules 113*a* and 113*b* may be learned first, respectively.

In this case, the first and second empathy evaluation modules 112*a* and 112*b* may be learned in such a way that the empathy to be learned or the empathy not to be learned is specified, so that the learning may be performed to increase the evaluation score when the empathy of the artificial intelligence of the counterpart is included in the empathy to be learned, and the learning may be performed to lower the evaluation score when the empathy of the artificial intelligence of the counterpart is included in the empathy not to be learned. For example, the first and second empathy evaluation modules 112 may be learned first in such a way that when the empathy of the conversation is "sadness", the score is increased, when the empathy of the conversation is similar to "sadness", the score is slightly lowered, and when the empathy is completely different from "sadness", the score is lowered.

In this case, the first and second conversation diversity-emotion weight evaluation modules 113*a* and 113*b* may be learned in such a way that by setting in advance whether to have an emotional conversation or a diverse conversation, the learning may be performed to increase the evaluation score when a conversation is generated as the setting, and conversely the learning may be performed to lower the evaluation score when the conversation is not generated as the setting. For example, the first and second conversation diversity-emotion weight evaluation modules 113*a* and 113*b* may be learned first in such a way that when diversity-emotion weight is composed of diversity: 50% and emotion: 50%, the evaluation score is increased, when the diversity-emotion weight is slightly different from the previous case, the evaluation score is slightly lowered than that of the previous case, and when the diversity-emotion weight is skewed to either diversity or emotion, the evaluation score is lowered.

As described above, in the system and method for generating a conversation between artificial intelligences, as evaluation criteria for appropriate conversation generation in the conversation between artificial intelligences, the empathy of the counterpart, the diversity of the conversation, and the weight of the emotion are utilized to the conversation, thereby having an advantage of generating an appropriate dialogue in the conversation between artificial intelligences.

In addition, the present invention may build a chatbot that generates only conversations with desired emotions by specifying the empathy to be learned and the empathy not to be learned by the chatbot in artificial intelligence learning. Therefore, there is the advantage that the present invention may be used in various fields such as a customer response chatbot that needs to unconditionally generate positive emotional responses.

The present invention has been described in detail through the preferred exemplary embodiments, but the present invention is not limited thereto, and it is apparent to those skilled in the art that various changes and applications may be made within the scope of the present invention without departing from the technical spirit of the present invention. Accordingly, the true protection scope of the present invention should be construed by the following claims, and all technical ideas within the scope equivalent thereto should be construed as being included in the scope of the present invention.

What is claimed is:

1. A system for generating an improved dialogue between artificial intelligences, the system comprising:

one or more processors; and a tangible, non-transitory memory coupled to the one or more processors and storing executable instructions that, when executed by the one or more processors, cause the system to:

receive, by a first artificial intelligence, an initial input from a user;

generate, by the first artificial intelligence, a first response to the initial input using a first response generation module;

provide, by the first artificial intelligence, the first response to a second artificial intelligence;

determine, by the second artificial intelligence, a first empathy evaluation score for the first response using a first deep learning model trained with first data identifying empathy to be learned and empathy not to be learned;

determine, by the second artificial intelligence, a first diversity-empathy evaluation score for the first response using a second deep learning model trained with second data identifying whether to generate an emotional conversation or a diverse conversation;

update, by the second artificial intelligence, a second response generation module based on the first empathy evaluation score and the first diversity-empathy evaluation score;

generate, by the second artificial intelligence, a second response to the first response using the updated second response generation module based on the first empathy evaluation score, the first diversity-empathy evaluation score, and the first response;

provide, by the second artificial intelligence, the second response to the first artificial intelligence;

determine, by the first artificial intelligence, a second empathy evaluation score for the second response using a third deep learning model trained with third data identifying empathy to be learned and empathy not to be learned;

determine, by the first artificial intelligence, a second diversity-empathy evaluation score for the second response using a fourth deep learning model trained with fourth data identifying whether to generate an emotional conversation or a diverse conversation;

update, by the first artificial intelligence, the first response generation module based on the second empathy evaluation score and the second diversity-empathy evaluation score;

generate, by the first artificial intelligence, a third response to the second response using the updated first response generation module based on the second empathy evaluation score, the second diversity-empathy evaluation score, and the second response; and provide, by the first artificial intelligence, the third response to the second artificial intelligence.

2. The system of claim 1, wherein the instructions, when executed by the one or more processors, further cause the system to:

terminate updating the first artificial intelligence and the second artificial intelligence when a number of responses provided between the first artificial intelligence and the second artificial intelligence exceeds a predetermined limit.

3. The system of claim 1, wherein the instructions, when executed prior to the generation of the first response by the one or more processors, further cause the system to:

train a first empathy evaluation module and a first diversity emotion-weight evaluation module associated with the first artificial intelligence; and train a second empathy evaluation module and a second diversity emotion-weight evaluation module associated with the second artificial intelligence.

4. The system of claim 3, wherein the instructions to train the first empathy evaluation module and the second empathy evaluation module, when executed by the one or more processors, further cause the system to:

train the first empathy evaluation module based on first specified data comprising empathy to be learned and empathy not to be learned; and train the second empathy evaluation module based on second specified data.

5. The system of claim 3, wherein the instructions to train the first diversity emotion-weight evaluation module and the second diversity emotion-weight evaluation module, when executed by the one or more processors, further cause the system to:

determine a first setting for the first diversity emotion-weight evaluation module, wherein the first setting defines whether the first diversity emotion-weight evaluation module favors an emotional conversation or a diverse conversion;

train the first diversity emotion-weight evaluation module based on the first setting;

determine a second setting for the second diversity emotion-weight evaluation module, wherein the second setting defines whether the second diversity emotion-weight evaluation module favors an emotional response or a diverse response; and train the second diversity emotion-weight evaluation module based on the second setting.

6. A method for generating an improved dialogue between artificial intelligences, the method comprising:

receiving, by one or more processors executing a first artificial intelligence, an initial input from a user;

generating, by the one or more processors executing the first artificial intelligence, a first response to the initial input using a first response generation module;

providing, by the one or more processors executing the first artificial intelligence, the first response to a second artificial intelligence;

determining, by the one or more processors executing the second artificial intelligence, a first empathy evaluation score for the first response using a first deep learning model trained with first data identifying empathy to be learned and empathy not to be learned;

determining, by the one or more processors executing the second artificial intelligence, a first diversity-empathy evaluation score for the first response using a second deep learning model trained with second data identifying whether to generate an emotional conversation or a diverse conversation;

updating, by the one or more processors executing the second artificial intelligence, a second response generation module based on the first empathy evaluation score and the first diversity-empathy evaluation score;

generating, by the one or more processors executing the second artificial intelligence, a second response to the first response using the updated second response generation module based on the first empathy evaluation score, the first diversity-empathy evaluation score, and the first response;

providing, by the one or more processors executing the second artificial intelligence, the second response to the first artificial intelligence;

determining, by the one or more processors executing the first artificial intelligence, a second empathy evaluation score for the second response using a third deep learning model trained with third data identifying empathy to be learned and empathy not to be learned;

determining, by the one or more processors executing the first artificial intelligence, a second diversity-empathy evaluation score for the second response using a fourth deep learning model trained with fourth data identifying whether to generate an emotional conversation or a diverse conversation;

updating, by the one or more processors executing the first artificial intelligence, the first response generation module based on the second empathy evaluation score and the second diversity-empathy evaluation score;

generating, by the one or more processors executing the first artificial intelligence, a third response to the second response using the updated first response generation module based on the second empathy evaluation score, the second diversity-empathy evaluation score, and the second response; and providing, by the one or more processors executing the first artificial intelligence, the third response to the second artificial intelligence.

7. The method of claim 6, further comprising:

terminating, by the one or more processors, updating the first artificial intelligence and the second artificial intelligence when a number of responses provided between the first artificial intelligence and the second artificial intelligence exceeds a predetermined limit.

8. The method of claim 6, further comprising:

training, by the one or more processors, a first empathy evaluation module and a first diversity emotion-weight evaluation module associated with the first artificial intelligence; and training, by the one or more processors, a second empathy evaluation module and a second diversity emotion-weight evaluation module associated with the second artificial intelligence.

9. The method of claim 8, wherein training the first empathy evaluation module and the second empathy evaluation module comprises:

training, by the one or more processors, the first empathy evaluation module based on first specified data comprising empathy to be learned and empathy not to be learned; and training, by the one or more processors, the second empathy evaluation module based on second specified data.

10. The method of claim 8, wherein training the first diversity emotion-weight evaluation module and the second diversity emotion-weight evaluation module comprises:

determining, by the one or more processors, a first setting for the first diversity emotion-weight evaluation module, wherein the first setting defines whether the first diversity emotion-weight evaluation module favors an emotional conversation or a diverse conversion;

training, by the one or more processors, the first diversity emotion-weight evaluation module based on the first setting;

determining, by the one or more processors, a second setting for the second diversity emotion-weight evaluation module wherein the second setting defines whether the second diversity emotion-weight evaluation module favors an emotional response or a diverse response; and training, by the one or more processors, the second diversity emotion-weight evaluation module based on the second setting.

* * * * *